United States Patent
Petzold

(10) Patent No.: US 6,498,985 B1
(45) Date of Patent: Dec. 24, 2002

(54) METHOD FOR MULTIMEDIA-SUPPORTED NAVIGATION AND NAVIGATIONAL DEVICE

(75) Inventor: Bernd Petzold, Wunstorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,847

(22) PCT Filed: Nov. 11, 1999

(86) PCT No.: PCT/EP99/08655

§ 371 (c)(1),
(2), (4) Date: Oct. 5, 2001

(87) PCT Pub. No.: WO00/29810

PCT Pub. Date: May 25, 2000

(30) Foreign Application Priority Data

Nov. 16, 1998 (DE) .......................................... 198 52 662

(51) Int. Cl.⁷ ............................................... G01C 21/30
(52) U.S. Cl. ........................ 701/211; 701/200; 701/209; 701/212; 701/214; 340/988; 340/990
(58) Field of Search .......................... 701/23, 200, 209, 701/211, 212, 214, 28; 340/988, 990, 995

(56) References Cited

U.S. PATENT DOCUMENTS

| 5,177,685 A | | 1/1993 | Davis et al. | |
|---|---|---|---|---|
| 5,343,399 A | * | 8/1994 | Yokoyama et al. | 340/995 |
| 5,475,599 A | * | 12/1995 | Yokoyama et al. | 340/995 |
| 6,282,490 B1 | * | 8/2001 | Nimura et al. | 701/208 |

FOREIGN PATENT DOCUMENTS

| DE | 196 17 764 | 11/1997 |
|---|---|---|
| EP | 0 323 245 | 7/1989 |
| EP | 0 837 434 | 4/1998 |
| WO | WO 97./18440 | 5/1997 |

OTHER PUBLICATIONS

Teletraffic, Telepublic–Verlag GmbH & Co. Medien KG, Hanover, Jun./Jul. 1998 Edition, p. 20*.

* cited by examiner

Primary Examiner—Gertrude Arthur
(74) Attorney, Agent, or Firm—Kenyon & Kenyon

(57) ABSTRACT

A navigational device having an information carrier is described which is used for the navigation of a motor vehicle in a road network. Driving directions, which refer to prominent objects along the travel route, in this connection are given to the user in everyday language and supported by an optical read-out.

12 Claims, 2 Drawing Sheets

METHOD FOR MULTIMEDIA-SUPPORTED NAVIGATION AND NAVIGATIONAL DEVICE

FIELD OF THE INVENTION

The present invention relates to an information carrier for a navigational device in a motor vehicle.

BACKGROUND INFORMATION

In conventional navigational systems, the driver is given driving instructions which are essentially limited to information concerning distance and direction. These driving instructions are clarified by optical illustration on a map. One information carrier for a navigational device is described in the journal Teletraffic, Telepublic-Verlag GmbH & Co. Medien KG, Hanover, June/July 1998 edition, page 20 ff. Data are stored which permit projecting a three-dimensional scene having those buildings drawn in which are supposed to simplify the user's orientation. In the immediate vicinity, a conventional map illustration is brought up. This illustration still differs from what the user would really see. Then, too, using this system, the user requires time to orient himself.

SUMMARY

The example information carrier according to the present invention has the advantage that designations and/or descriptions of prominent objects in the vicinity of the road network are stored in the information carrier. The designations and/or descriptions can be output acoustically. Prominent objects include, monuments. In this connection, it may be sufficient to call such a prominent object by its designation, e.g. "post office" or "station", or one may broaden the designation, e.g. "red residential home" or "blue factory building". The concept of description is supposed to include such broadened designations. If such prominent objects are output by a navigational device as driving directions, it makes the user's orientation during the trip easier in road traffic, by virtue of the prominent and therefore not difficult-to-recognize objects in the vicinity of the vehicle. Owing to the acoustical read-out, the driver does not have to look away from street traffic and concentrate on a screen. Owing to the high recognition value of a prominent object, even at greater distances, as a rule, an exact distance statement in meters can be omitted, since for many users it would be difficult to comprehend anyway in street traffic, especially in an area not known to the user.

As a result of the measures specified in the dependent claims, advantageous further refinements and improvements of the information carrier, indicated in the main claim, are possible.

It is especially advantageous that video data on the prominent objects are stored in the information carrier, and that these video data can be output optically. This offers the advantage that an optical indication of the prominent object can appear in support of the acoustical read-out. This can make the user's orientation easier as compared to a purely acoustical read-out, particularly when there is loud extraneous noise.

It is furthermore advantageous that the geographic position of the prominent object is stored on a digital map in the information carrier, next to the position of the prominent object. This makes it possible to include objects which are not directly in or at the road network, but lie away from it, as, for example, a terrain elevation.

Furthermore, it is advantageous to use a navigational device for navigating a motor vehicle in a road network together with the information carrier whereby driving instructions can be acoustically output, if designations and/or descriptions of the prominent objects are linked to directional information and locality relationships, such as, for instance, "turn right, after the red brick church" or "turn left in front of the main station". Since the driving instructions contain references to these prominent objects, the driver receives a driving instruction such as is common in everyday language, and as would take place in route descriptions among people. That makes it easy to understand and does not require great powers of abstraction.

It is also advantageous to supplement directional information by an optical read-out of the prominent objects. In that way, the user gets still more information on the specified direction besides the additional optical information.

It is also of advantage that the data on additional prominent objects can be made available, including their position, to the digital map of the navigational device via a mobile data carrier and/or a radio connection. This makes it possible for oneself to generate driving instructions, particularly while using an additional computer. These data can be used for stretches of road for which no data are stored in the information carrier or for stretches of road reaching the destination, particularly on the last portion of the trip, for which the available data are not exact enough. Such a case can arise, for example, when one is trying to reach a home in a residential area or a company in an industrial area. In addition to that, it is possible to connect the designation and/or description of additional prominent objects with advertising data.

Another advantage is that additional data on prominent objects can be received from a service control point by radio connection. So it is possible to receive via radio up-to-date or also, if necessary, more precise data than are stored in the information carrier. By doing that, the storage requirement in the vehicle can be reduced.

It is of further advantage that at least a part of the navigational device can also be taken out of the motor vehicle as a mobile part, so that it can also be available to other traffic participants, such as pedestrians

BRIEF DESCRIPTION OF THE DRAWING

Exemplary embodiments of the present invention are depicted in the Drawings and are explained more precisely in the following description.

The Figures show.

DESCRIPTION OF THE EXEMPLARY EMBODIMENT

Figure 1:
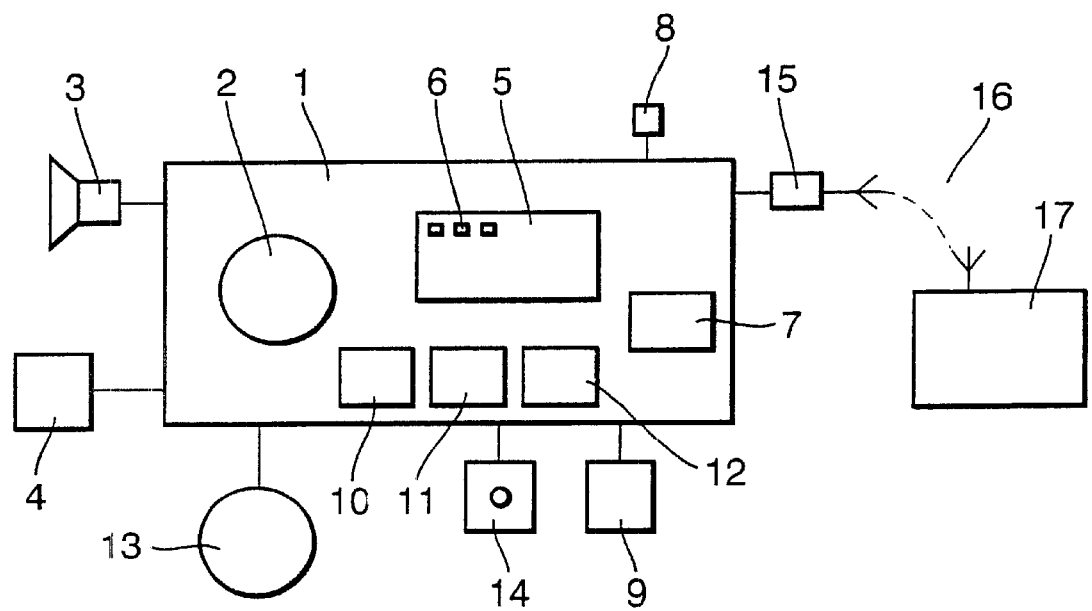
FIG. 1 a navigational device according to the present invention.

FIG. 1 shows a navigational device 1 according to the present invention, having a disc drive for an information carrier 2, on which the data on the prominent objects are stored. The navigational device is equipped with an audio output 3 and a video output 4. The navigational device also has available an input unit 5 equipped with turning knobs or keys 6. The navigational device also has available a GPS receiver having an antenna 8, via a computer unit for determining position 7, and is connected to vehicle sensor 9, especially for determining position. Then, also, navigational device 1 has a unit for system management 10, a computer for determining travel routes 11 and a computer for the output of travel directions 12. Navigational device 1 optionally may have a further disc drive 13 for an additional information carrier, on which a digital map may be stored. Optionally, a disc drive 14 is further provided for a rewritable information carrier, especially for a floppy disc. Navigational device 1 can also be connected to a service control point 17 via a transmitting unit 15 and via a radio link 16.

At the beginning of a trip or when there is a change in the driving destination, the user punches into input device 5 a driving destination into navigational device 1, using keys 6. Here control of the input takes place via video output 4. Optionally, input can also take place via video output 4, in case this is designed as a touch screen monitor or as a monitor having operational elements. The input data concerning the driving destination are passed by the unit for system management on to the computer for trip route determination 11. The processing unit for trip route determination 11 calculates a trip route based on data on information carriers which are made available as a digital map in disc drive 2 and/or 13. This trip route can be supplemented by updated data from the service control point via receiver 15 and radio connection 16. Furthermore, the position of the vehicle is also included, which is calculated via the unit for determining position 7 on the basis of the data provided by GPS receiver 8 and vehicle sensors 9. The trip route is passed on to the processing unit for the output of driving instructions 12. The processing unit for the output of driving instructions 12 now ascertains prominent objects lying along the travel route, and links the designations and/or descriptions of these prominent objects, stored in the information carrier in disc drive 2, to locality references and directional information, so that driving directions with reference to the prominent objects are created. Examples of locality references are: "before, after, to the right/left of, at, next to, at the top of". Examples of directional information are: "turn off right/left, continue straight ahead, sharp left/right turn-off, get into lane right/left, stop". The driving directions are output one after another via audio output 3. For this purpose, the position of the vehicle is monitored by the unit for determining position. For this, too, the unit for determining position makes use of GPS receiver 8 and vehicle sensors 9. The updated position of the vehicle ascertained in this manner is compared with the digital map. The driving instruction referenced to a prominent object is output at a predefined distance before this position is reached. In this connection, the predefined distance can be dependent on the type of road, i.e. on an expressway the driving instruction is output earlier than on a narrow country road.

If the processing unit for determining the trip route has established, for example, that in a certain town the driver should turn off to the right after the main post office, 150 m before the main post office, for example, the audio output announces: "After the main post office turn off to the right". Therefore, the processing unit for reading out driving instructions 12 is designed in such a way, that it can convert the data on the prominent objects stored in information carrier 2, as well as the locality references and directional information, to audio signals, which are output via audio output 3. For this purpose, the data on the prominent objects, the locality references and the directional information are preferably stored in text form, the text being supplemented with additions containing information concerning pronunciation. Optionally, there is the further possibility of storing the text to be output directly as an audio signal (e.g. as a *.wav data file) in the data carrier. Video output of the prominent object can optionally take place via video output 4. Thus, for example, shortly before the main post office an image of the building can be faded in as a photo or a sketch. Particularly in the case of buildings passed by a plurality of streets, such an object can be stored in the form of several views on the information carrier, so that, depending on his position, the user can be offered that view which he is currently seeing. For the optical representation of the prominent objects it must further be considered that some objects are not visible at night. This information should be stored along with the designation of the object. In such a case the navigational device has to resort to conventional driving instructions.

If prominent objects lie away from the road, an adaptation of the locality reference is possible if the geographical position has been stored too. One might then choose, for instance, the locality reference "at the level of".

To save storage space, data on prominent objects lying on minor roads can be stored in service control point 17 instead of the information carrier, or fed to the navigational device via disc drive 14, e.g. in the form of a floppy disc, or via disc drive 13, e.g. in the form of a CD or DVD. In particular, one can additionally place data concerning prominent objects at the disposal of such a user by transmitting data via service control point 17 or by sending an information carrier for disc drives 13 or 14. To do this, the service control point may advantageously be brought into contact with the Internet via a connection not drawn in. That makes it possible to make available to the navigational device of business customers, for example, the way to one's own company. With the use of the user's PC, such route descriptions can be produced independently in the form of a succession of driving directions. With the use of a digital camera or a scanner it is possible to supplement the information by an optical illustration of prominent objects. With data on prominent objects transmitted by service control point 17, it is also possible to tie in advertising data with the transmission and to illustrate at least a part of the prominent objects in connection with the advertising message. In service control point 17 there can be a counter for this, not drawn in, for counting these advertising data hits for thus billing the advertiser. Radio connection 16 between receiver 15 and service control point 17 is preferably produced via a GSM connection. The interchangeable data carriers for disc drives 12 and 13 are preferably a CD-ROM, a DVD or a magneto-optical storage medium. A floppy disc, a semiconductor device or a memory card is preferably provided for disc drive 14. This memory card can also store a user profile.

Figure 2:
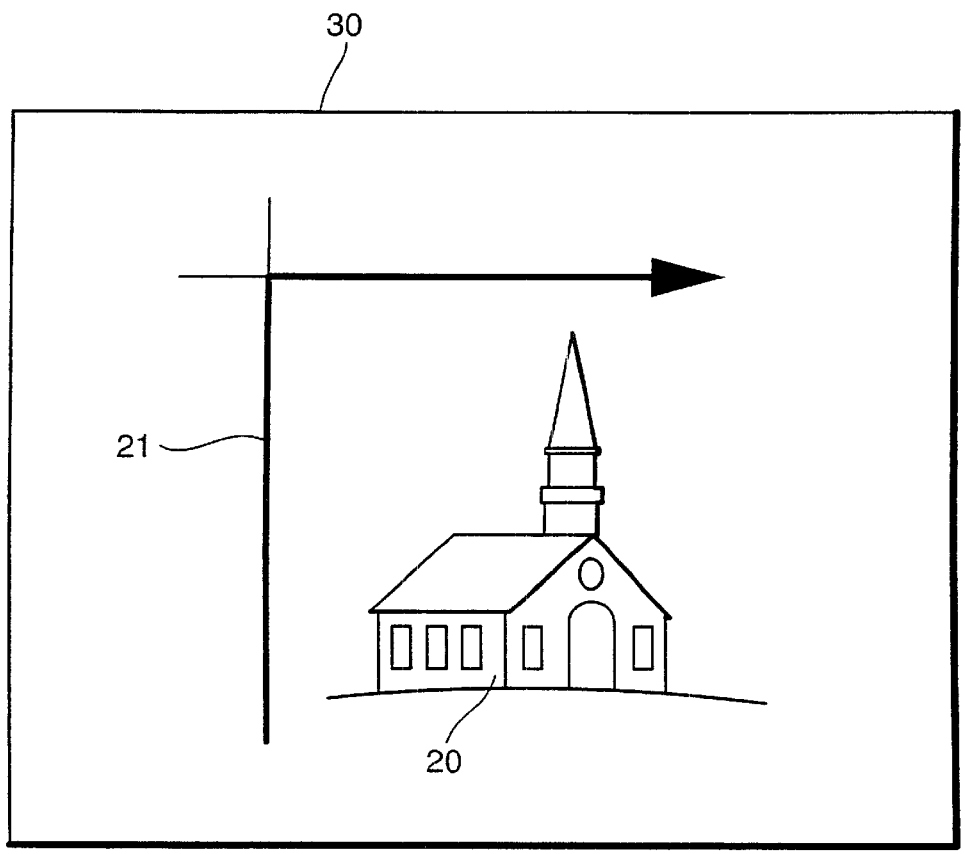
FIG. 2 a representation of the optical read-out of video data on the prominent objects.

FIG. 2 illustrates an example of the video output. In a screen display 30 a prominent object, here a church 20, and a directional indication, here a turn-off arrow 21 are shown. In addition to this pictorial illustration there is a text output via an acoustical output unit 3, saying, "after the chucrch turn off to the right". In the illustration this is recognized in that turn-off arrow 21 bends off behind the church 20. In place of the symbol picked here for the church 20 a picture illustration as a photo can be used too.

What is claimed is:

1. A navigation device for navigating a vehicle in a road network, comprising:

an information carrier storing a digital road map to the navigation device, data on prominent objects being stored on the information carrier, a position on the digital road map being assigned to each of the prominent objects, a plurality of views of the prominent objects being stored on the information carrier;

an acoustical output device that outputs a driving instruction acoustically, the driving instruction referring to a selected one of the prominent objects, at least one of definitions and descriptions of the prominent objects being linked with respective directional information and locality references; and an optical output device that optically outputs the selected one of the prominent objects to which the driving instruction refers, the respective directional information linked to the selected one of the prominent objects being displayed optically in connection with the selected one of the prominent objects.

2. The navigational device according to claim 1, further comprising:

a receiver configured to receive data on additional prominent objects from a mobile data carrier, the data on the additional prominent objects including a respective position of each of the additional prominent objects, the data on the additional prominent objects being generated on the digital road map.

3. The navigational device according to claim 2, wherein the receiver includes a radio connection.

4. The navigational device according to claim 2, further comprising:

a receiver configured to at least intermittently bring the navigational device into connection with a service control point via a radio connection.

5. The navigational device according to claim 4, wherein additional data on the prominent objects are stored in the service control point.

6. The navigational device according to claim 4, wherein the service control point connects to the Internet.

7. The navigational device according to claim 1, wherein the navigational device is a mobile part that is removable from the vehicle.

8. The navigational device according to claim 1, wherein the navigational device is configured to receive sequences of driving instructions provided by a user.

9. The navigational device according to claim 1, wherein the driving instruction referring to the selected one of the prominent objects is output at a predefinable distance before the selected one of the prominent objects, the predefinable distance being dependent upon a type of road being traveled.

10. The navigational device according to claim 1, wherein the optical output device outputs a photo of the selected one of the prominent objects.

11. A rewritable information carrier for a navigational device, comprising:

a first storage location storing a digital road map;

a second storage location storing at least one of designations and descriptions of prominent objects in a vicinity of a road network of the digital road map, positions being assigned to the prominent objects in the road network, the at least one of the designations and descriptions being in a form configured for acoustical output; and a third storage location storing video data on the prominent objects, the video data being in a form configured for optical output.

12. The information carrier according to claim 11, further comprising:

a fourth storage location storing a geographic position of each of the prominent objects.

* * * * *